(12) United States Patent
Li et al.

(10) Patent No.: US 8,876,250 B2
(45) Date of Patent: Nov. 4, 2014

(54) METHOD AND DEVICE FOR MEASURING TOTAL AMOUNT OF INK IN INK-JET PRINTING APPARATUS

(75) Inventors: Haifeng Li, Beijing (CN); Yanman Ma, Beijing (CN); Yuying Bai, Beijing (CN)

(73) Assignees: Peking University Founder Group Co., Ltd., Beijing (CN); Beijing Founder Electronics Co., Ltd., Beijing (CN); Peking University Founder R&D Center, Beijing (CN)

( * ) Notice: Subject to any disclaimer, the term of this patent is extended or adjusted under 35 U.S.C. 154(b) by 0 days.

(21) Appl. No.: 13/997,119

(22) PCT Filed: Dec. 23, 2011

(86) PCT No.: PCT/CN2011/084580
§ 371 (c)(1),
(2), (4) Date: Dec. 19, 2013

(87) PCT Pub. No.: WO2012/083883
PCT Pub. Date: Jun. 28, 2012

(65) Prior Publication Data
US 2014/0125727 A1     May 8, 2014

(30) Foreign Application Priority Data
Dec. 23, 2010 (CN) .......................... 2010 1 0620433

(51) Int. Cl.
*B41J 29/393* (2006.01)
*G01J 3/50* (2006.01)
*B41J 2/175* (2006.01)
*B41J 2/045* (2006.01)
*G01J 3/52* (2006.01)

(52) U.S. Cl.
CPC ............... *B41J 2/04558* (2013.01); *G01J 3/50* (2013.01); *B41J 2/17566* (2013.01); *B41J 2002/17569* (2013.01); *G01J 3/52* (2013.01)
USPC .......................................................... 347/19

(58) Field of Classification Search
USPC .................. 347/9, 12, 14, 15, 19, 40, 43
See application file for complete search history.

(56) References Cited

U.S. PATENT DOCUMENTS

2009/0244634 A1   10/2009  Hasegawa et al.

FOREIGN PATENT DOCUMENTS

| | | |
|---|---|---|
| CN | 1060567 C | 1/2001 |
| CN | 101396922 A | 4/2009 |
| CN | 102019756 A | 4/2011 |
| JP | 7164622 A | 6/1995 |
| JP | 10339807 A | 12/1998 |
| WO | 2012/083883 A1 | 6/2012 |

OTHER PUBLICATIONS

International Search Report for PCT/CN2011/084580 mailed Mar. 3, 2012, 6 pages.

*Primary Examiner* — Kristal Feggins
(74) *Attorney, Agent, or Firm* — Kilpatrick Townsend & Stockton LLP; Kenneth R. Allen

(57) ABSTRACT

The application discloses a method for measuring the total amount of ink of an inkjet printing device. The method may include: printing a sampling figure (S10); measuring the color of the sampling figure by a measuring device (S20); and determining the total amount of ink according to the measurements (S30). The application also discloses an apparatus for measuring the total amount of ink of an inkjet printing device. The apparatus may include a printing module (10) configured to print a sampling figure; a measuring device (20) configured to measure the color of the sampling figure by a measuring device; and a determining module (30) configured to determine the total amount of ink according to the measurements. The method and the apparatus can improve the inkjet printing quality.

15 Claims, 4 Drawing Sheets

METHOD AND DEVICE FOR MEASURING TOTAL AMOUNT OF INK IN INK-JET PRINTING APPARATUS

CROSS REFERENCE OF RELATED APPLICATIONS

This application claims the benefit of Chinese patent application No. 201010620433.9, filed on Dec. 23, 2010, which is incorporated by reference in its entirety as part of this application.

TECHNICAL FIELD

The present application relates to the field of printing, in particular, to a method and an apparatus for measuring the total amount of ink of an inkjet printing device.

BACKGROUND

The operating principle of an inkjet printing device is that some ink droplets with fixed size are sprayed onto a surface of a printing stock. The disadvantage is that it needs some time to dry the liquid ink. If the amount of the droplets sprayed on a paper is too large and the paper cannot fix or absorb the droplets rapidly, it will cause the ink droplet to flow, diffuse or permeate on the paper. This makes the printed image look dirty, fuzzy, and with a decreased contrast, or even makes the paper distorted. The current inkjet printing device is turned from the beginning of 4 color into 6, 7, 8 or even more color, and the size of the ink droplet can also be divided into big, medium and small. When several different kinds of ink are printed in a same place simultaneously, it can easily lead to a droplet accumulation to cause ink pilling and flowing etc.

There are some different methods to solve the ink pilling problem, for example, to add a coating on the surface of the paper in order to facilitate the ink droplet absorbing and fixing. In addition, the ink properties can be changed, i.e. to use "quick-drying" ink. However, the improvement of paper and ink performance is limited, it cannot solve the problem of ink pilling completely and may even create new problems to cause the image quality decreasing. On condition of particular paper and ink, the most effective way to solve the problem of ink pilling is to control the ink amount printed on the paper, and this needs to determine a threshold of the output amount of the ink that can just avoid the ink pilling, that is, to determine the total amount of ink.

The most commonly used method for determining the total amount of ink includes: printing an evaluating graph; and then determining an appropriate total amount of ink according to certain rules by an operator. But the method has a problem that the determined result is highly affected by subjective factors. Because each person's sense to the color is different, for the same evaluating graph, to observe the total amount of ink by different people will usually obtain different results. Therefore, the operator needs to have some experience to determine a correct total amount of ink.

SUMMARY

The present application intends to provide a method and an apparatus for measuring the total amount of ink of an inkjet printing device to solve the problem of highly affecting by the subjective factor in the prior art.

According to one embodiment of the present application, a method for measuring the total amount of ink of an inkjet printing device is provided. The method may include: printing a sampling figure; measuring the color of the sampling figure by a measuring device; and determining the total amount of ink according to the measurements.

According to another embodiment of the present application, an apparatus for measuring the total amount of ink of an inkjet printing device is provided. The apparatus may include a printing module configured to print a sampling figure; a measuring device configured to measure the color of the sampling figure by a measuring device; and a determining module configured to determine the total amount of ink according to the measurements.

The method and the apparatus for measuring the total amount of ink of an inkjet printing device according to the embodiment of the present invention will solve the problem of highly affecting by the subjective factor in the prior art to improve the inkjet printing quality because the color is measured by the measuring device.

BRIEF DESCRIPTION OF THE DRAWING

The drawings described herein are used to provide a further understanding to the present application and constitute a part of this specification. Exemplary embodiments of the present application and their descriptions serve to explain the present application and do not constitute improper limitation on the present application. In the drawings.

DETAILED DESCRIPTION

Hereinafter, the present application will be explained in detail with reference to the accompanying drawings in connection with the embodiments. It should be noted that the present invention relates to the field of printing, so that it needs inevitably to use a color chart to illustrate the treatment effect of the printing device. However, because the reason of publishing and printing, the original colorful image is rendered as a black and white picture, the specification will try to explain the color case in words.

Figure 1:
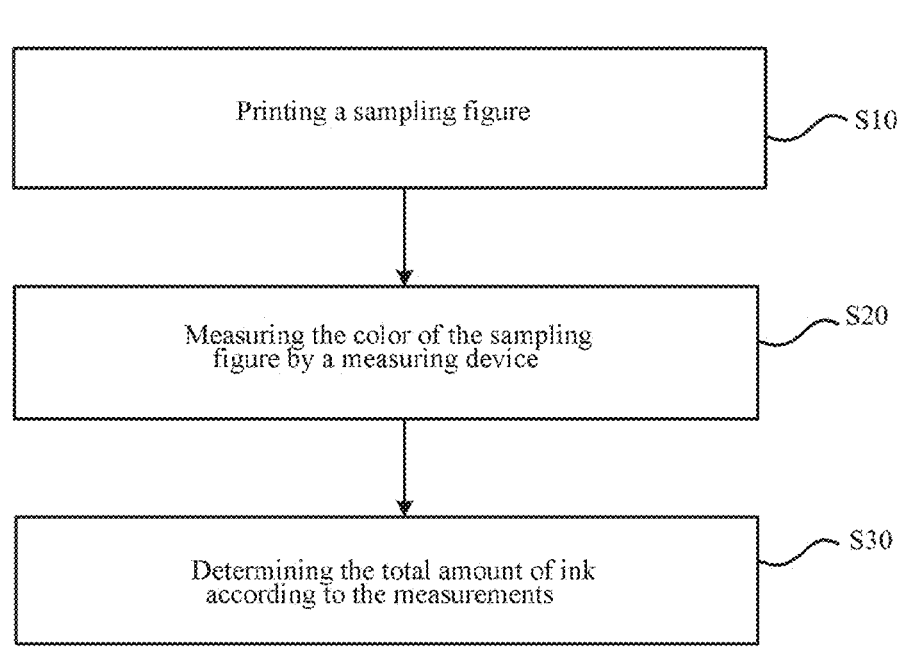
FIG. 1 is a flowchart illustrating a method for measuring the total amount of ink of an inkjet printing device according to an embodiment of the present application.

FIG. 1 is a flowchart illustrating a method for measuring the total amount of ink of an inkjet printing device according to an embodiment of the present application, the method may include:

a step S10 of printing a sampling figure;

a step S20 of measuring the color of the sampling figure by a measuring device; and a step S30 of determining the total amount of ink according to the measurements.

In the prior art, the total amount of ink is determined by person's subjective judgment, but in the method for measuring the total amount of ink according to the embodiment, the color is measured by the measuring device, so that the problem of highly affecting by the subjective factor in the prior art can be solved and thus the total amount of ink can be determined automatically and accurately to improve the inkjet printing quality.

Preferably, the primary color includes cyan C, magenta M, yellow Y and black K. The step S10 includes: printing a series of CMY three-color equal gray blocks: TD={$a_1, a_2, \ldots, a_i, \ldots, a_m$}, $a_i \in [0,100\%]$; printing a series of CMYK four-color equal gray blocks: QD={$b_1, b_2, \ldots, b_i, \ldots, b_n$}, $b_i \in [0,100\%]$; where TD represents a set of dot area coverage of the CMY three-color equal gray in an ascending order; $a_i$ represents the i-th dot area coverage of the CMY three-color equal gray; m represents the number of the CMY three-color equal gray blocks; QD represents a set of dot area coverage of the CMYK four-color equal gray in an ascending order; $b_i$ represents the i-th dot area coverage of the CMYK four-color equal gray; n represents the number of the CMYK four-color equal gray blocks; and the dot area coverage of the blocks satisfies the following relationship: $a_1 \geq b_1$, $a_m = b_n = 100\%$.

The CMYK are the most common four primary colors used for the printing output system. In the preferable embodiment of the present application, it prints the CMYK primary colors and thus can be applied to most of applications.

Figure 2:
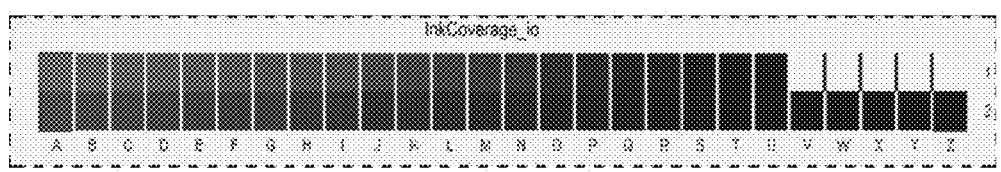
FIG. 2 illustrates a color target figure for measuring the total amount of ink according to a preferable embodiment of the present application.

FIG. 2 illustrates a color target figure, i.e. sampling figure, for measuring the total amount of ink according to a preferable embodiment of the present application. The color blocks of the sampling figure used in the embodiment of the present invention can be two sets of data: two sets of data: one set is three-color equal gray blocks and the other set is four-color equal gray blocks.

The dot area coverage of each color block on the color target figure is as follows:

three-color grey blocks (21 blocks):

$$TD = \left\{ \begin{matrix} 60, 62, 64, 66, 68, 70, 72, 74, 76, 78, 80, 82, 84, 86, 88, \\ 90, 92, 94, 96, 98, 100 \end{matrix} \right\}, \text{unit } \%$$

four-color grey blocks (26 blocks):

$$QD = \left\{ \begin{matrix} 50, 52, 54, 56, 58, 60, 62, 64, 66, 68, 70, 72, 74, 76, 78, 80, \\ 82, 84, 86, 88, 90, 92, 94, 96, 98, 100 \end{matrix} \right\},$$

unit %

Preferably, the step S20 includes: measuring the following data of a series of CMY three-color equal gray blocks: TM={$s_1, s_2, \ldots, s_i, \ldots, s_m$}; measuring the following data of a series of CMYK four-color equal gray blocks: QM={$t_1, t_2, \ldots, t_i, \ldots, t_n$}; where TM represents a set of measured data of the CMY three-color equal gray blocks; $s_i$ represents the measured value of the block $p_i$ of the set TC; QM represents a set of measured data of the CMYK four-color equal gray blocks; $t_i$ represents the measured value of the block $q_i$ of the set QC; TC={$p_1, p_2, \ldots, p_i, \ldots, p_m$}, QC={$q_1, q_2, \ldots, q_i, \ldots, q_n$}, where TC represents a color set of the CMY three-color equal gray blocks; $p_i$ represents the color of the i-th dot of the CMY three-color equal gray blocks, $p_i$={$C_i + M_i + Y_i$}, $i \in [1,m]$, $C_i$, $M_i$, and $Y_i$ represent the color of the i-th dot of C, M and Y in the CMY three-color equal gray blocks, respectively, and $C_i$, $M_i$, and $Y_i$ satisfy the following relationship: $C_i = M_i = Y_i = a_i$; QC represents a color set of the CMYK four-color equal gray blocks; $q_i$ represents the color of the i-th dot of the CMYK four-color equal gray blocks, $q_i$={$C_i + M_i + Y_i + K_i$}, $i \in [1,n]$, $C_i$, $M_i$, $Y_i$ and $K_i$ represent the color of the each dot of C, M, Y and K in the CMYK four-color equal gray blocks, respectively, and $C_i$, $M_i$, $Y_i$ and $K_i$ satisfy the following relationship: $C_i = M_i = Y_i = K_i = b_i$.

Specifically, for the preferable embodiment shown in FIG. 2, the color of the color blocks on the sampling figure can be represented by the following equation:

$$TC = \{p_1, p_2, \ldots, p_i, \ldots, p_m\}$$

$$QC = \{q_1, q_2, \ldots, q_i, \ldots, q_n\}$$

where TC represents a color set of the three-color equal gray blocks;

$p_i$ represents the color of one of the three-color equal gray blocks, $p_i$={$C_i + M_i + Y_i$}, $i \in [1,m]$, (where "+" represents an overprint relationship);

$C_i$, $M_i$, and $Y_i$ represent the dot area coverage of Cyan, magenta and yellow at a dot, respectively, and $C_i$, $M_i$, and $Y_i$ satisfy the following relationship:

$$C_i = M_i = Y_i = a_i;$$

QC represents a color set of the four-color equal gray blocks;

$q_i$ represents the color of one of the four-color equal gray blocks;

$q_i$={$C_i + M_i + Y_i + K_i$}, $i \in [1,n]$ (where "+" represents an overprint relationship);

$C_i$, $M_i$, $Y_i$ and $K_i$ represent the dot area coverage of Cyan, magenta, yellow and black at a dot, respectively, and $C_i$, $M_i$, and $Y_i$ satisfy the following relationship: $C_i = M_i = Y_i = K_i = b_i$.

In the embodiment of the present invention, the color blocks of the sampling figure are measured by the measuring device to obtain the measured data. The measured value can use the brightness value L* or visual density value (K density value) in the chromatic value L*a*b*.

The measured data are represented as follows:

$$TM = \{s_1, s_2, \ldots, s_i, \ldots, s_m\}$$

$$QM = \{t_1, t_2, \ldots, t_i, \ldots, t_n\}$$

where TM represents a set of measured data of the three-color equal gray blocks;

si represents the measured value of the block pi of the set TC;

QM represents a set of measured data of the four-color equal gray blocks; and ti represents the measured value of the block qi of the set QC.

The measured value can use the brightness value L* or visual density value (K density value) in the chromatic value L*a*b*. In the preferable embodiment, the printer of Epson 7880, the ink of original Epson 8-color ink, and the paper of Epson Advanced Proofing Paper (195 g) are used to print the sampling figure in FIG. 2. The measuring device is EyeOne-IO from X-Rite and the K density in the measuring device is used.

The EyeOne-IO is used to measure the color density values of the three-color equal grey blocks and the four-color equal grey blocks and to extract K density value therein. The measured K density value is shown in Table 1 of FIG. 3.

Preferably, the step S30 includes: calculating the following equation 1 for the CMY three-color equal grey:

$$Sp3 = \begin{cases} 100 & (-0.05 < temp < 0.05) \\ \dfrac{Sumx1 * Sumy - Sumx0 * Sumxy}{temp} & (temp \leq -0.05 \text{ or } temp \geq 0.05) \end{cases}$$

$$\text{where} \begin{cases} sumx0 = num \\ Sumx1 = \sum_{i=1}^{num} x[i] \\ Sumx2 = \sum_{i=1}^{num} (x[i] * x[i]) \\ Sumy = \sum_{i=1}^{num} (y[i] * 100) \\ Sumxy = \sum_{i=1}^{num} (x[i] * y[i] * 100) \\ temp = Sumx1 * Sumx1 - Sumx0 * Sumx2 \end{cases}$$

num represents the number of the dots of CMY three-color equal grey; x[i] represents the dot area coverage of the i-th dot of the CMY three-color equal gray; and y[i] represents the measured value of the i-th dot of the CMY three-color equal gray.

From the n scatter dots of the CMYK four-color equal grey, beginning with the first dot, continuous t dots are chosen each time, t∈[3,n], and then they are calculated in turn according to the following equation 2:

$$Sp4[i] = \begin{cases} 100 & (-0.05 < temp < 0.05) \\ \dfrac{Sumx1 * Sumy - Sumx0 * Sumxy}{temp} & (temp \leq -0.05 \text{ or } temp \geq 0.05) \end{cases}$$

where num represents t, x[i] represents the dot area coverage of the i-th dot of the CMYK four-color equal gray; and y[i] represents the measured value of the i-th dot of the CMYK four-color equal gray;

the first time: choosing the dots 1, 2, . . . , 1+t and bringing them into the equation 2 to calculate sp4[1];

the second time: choosing the dots 2, 3, . . . , 2+t and bringing them into the equation 2 to calculate sp4[2];

. . . .

the i-th time: choosing the dots i, 1+1, . . . , i+t and bringing them into the equation 2 to calculate sp4[i];

. . . .

the (n–t)-th time: choosing the dots n–t, (n–t)+1, . . . , n and bringing them into the equation 2 to calculate sp4[n–t]; for the data of CMYK four-color equal grey blocks, when the process is proceeded to a dot A, if sp4[i+1]<sp4[i]*n or sp4[i+1]<sp3*n, where n is coefficient, the total amount of ink is determined to Out1=k1*4, where k1 is the dot area coverage of the dot A; if the dot which meets the above conditions cannot be found, the total amount of ink is determined to Out1=400.

Figures 3, 4:
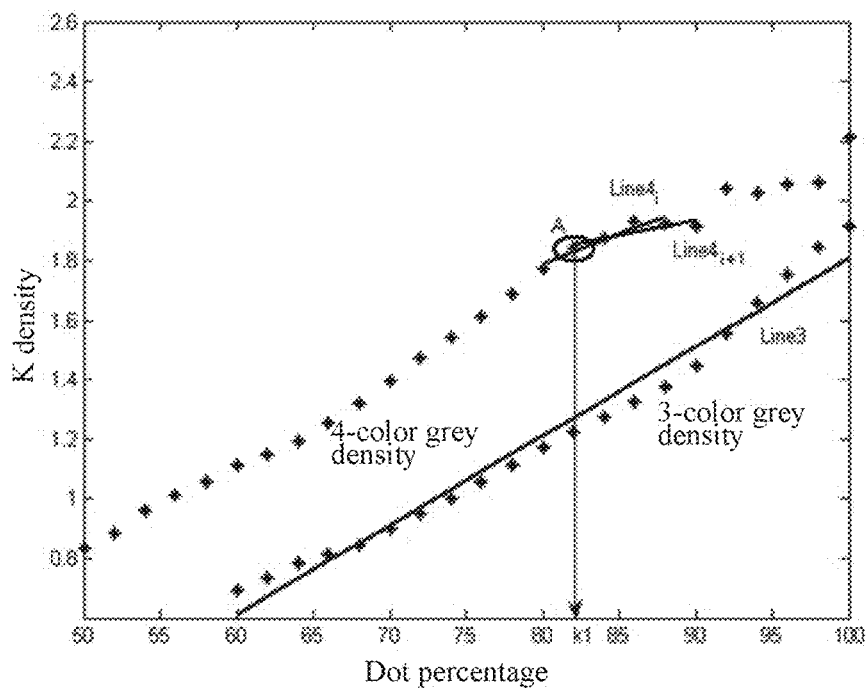
FIG. 3 illustrates measured data according to a preferable embodiment of the present application.
FIG. 4 illustrates a calculation of the total amount of ink out1 according to a preferable embodiment of the present application.

FIG. 4 illustrates a calculation of the total amount of ink out1 according to a preferable embodiment of the present application. It can be seen from the FIG. 4, the equations 1 and 2 according to the embodiment of the present invention correspond to a method including drawing curves on the basis of the sampling measurement data and calculating the slope of the curve. Specifically, the method includes:

drawing curves on the basis of the sampling measurement data, in which the horizontal axis can be the dot area coverage and the vertical axis can be the measured value, that is, the sets TD and TM are used to represent the curve data of the three-color equal grey blocks, and the sets QD and QM are used to represent the curve data of the four-color equal grey blocks.

The area on which the ink pilling and gradation problems are generated, i.e. on which the maximum total amount of ink is generated, is determined according to the trend of the curve. That is, the inflection point will be looked for on the basis of the slope of the curve, the calculating steps are given as follows:

drawing a scatter diagram of the three-color equal grey blocks, fitting a straight line Line3 on the basis of these scatters, bringing the abscissa and ordinate data of the m scatters into the equation 1 (in the equation, num=m), and calculating the slope of the curve and recording it as sp3.

Similarly, a scatter diagram is drawn for the four-color equal grey blocks, and the there are n scatters on the diagram. From the n scatters, continuous t scatters (t∈[3,n]) are chosen each time to fit a straight line. The abscissa and ordinate data of the t scatters are brought into the equation 2 (in the equation, num=t) to calculate the slope, where t=5 in the FIG. 4.

According to the equation 2, the slope is calculated sequentially from the first point in accordance with the following method:

the first time: choosing the dots 1, 2, . . . , 1+t, fitting a straight line Line4$_1$ and calculating the slope sp4[1];

the second time: choosing the dots 2, 3, . . . , 2+t, fitting a straight line Line4$_2$ and calculating the slope sp4[2];

. . . .

the i-th time: choosing the dots i, 1+1, . . . , i+t, fitting a straight line Line4$_i$ and calculating the slope sp4[i];

the (i+1)-th time: choosing the dots i+1, i+2, . . . , (i+1)+t, fitting a straight line Line4$_{i-1}$ and calculating the slope sp4[i+1];

. . . .

the (n–t)-th time: choosing the dots n–t, (n–t)+1, . . . , n, fitting a straight line Line4$_{n-t}$ and calculating the slope sp4[n–t].

For the data of CMYK four-color equal grey blocks, when the process is proceeded to a dot A, if sp4[i+1]<sp4[i]*n or slop4[i+1]<sp3*n (where n is coefficient which is 0.6 in FIG. 4), then the dot area coverage k1 of the horizontal axis corresponding to the dot A is the first total amount of ink to be looked for and recorded as Out1, and Out1=k1*4, the total amount of ink is Out1=k1*4=82*4=328.

If the dot which meets the above conditions cannot be found, then the dot whose dot area coverage is 100% is taken as the dot of total amount of ink, that is, k1=100, so that the calculated total amount of ink is Out1=k1*4=100*4=400.

Preferably, the step S30 includes: using a density of a dot at which C, M and Y of the CMY three-color equal grey blocks satisfy the relationship C=M=Y=100 as the maximum density; looking for the dot B with the same density in the CMYK four-color equal curves; and determining the total amount of ink Out2=K2*4, where k2 is the dot area coverage of the dot B; if the dot which meets the above conditions cannot be found, then determining the total amount of ink Out2=400.

Figure 5:
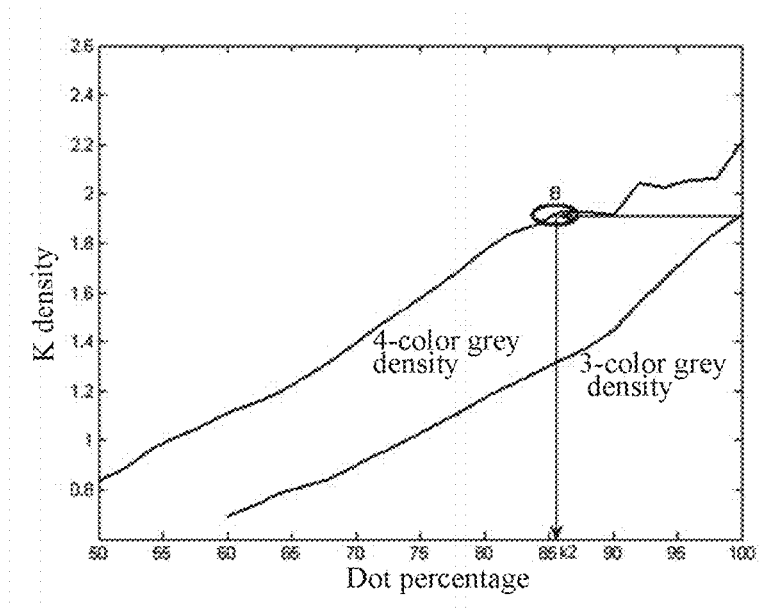
FIG. 5 illustrates a calculation of the total amount of ink out2 according to a preferable embodiment of the present application.

FIG. 5 illustrates a calculation of the total amount of ink out2 according to a preferable embodiment of the present application. In the preferable embodiment, the total amount of ink Out2 can be calculated in accordance with three-color combination maximum value judgment rule.

The curves of three-color and four-color equal grey are drawn in the same diagram, and the density of the vertex of the three-color equal curve (i.e. the dot at which C=M=Y=100) is used as the maximum density. The dot B with the same density is to be looked for in the four-color equal curve, that is, to fit a straight line from the vertex in a direction parallel to the horizontal axis, and the straight line and the four-color equal curve intersect at the dot B, and then the abscissa k2 corresponding to the dot B is the second dot of total amount of ink to be looked for and to be recorded as Out2, Out2=K2*4. The total amount of ink in the figure can be Out2=K2*4=86*4=344.

If the dot which meets the above conditions cannot be found, then the dot whose dot area coverage is 100% is taken as the dot of total amount of ink, that is, k2=100, so that the calculated total amount of ink is Out2=k2*4=100*4=400.

Preferably, the step S30 includes: drawing a curve graph on the basis of measurement result by using the dot area coverage as the horizontal axis and using the measured value as vertical axis, in which the sets TD and TM are used to the data of the CMY three-color equal grey and the sets QD and QM are used to the data of the CMYK four-color equal grey; looking for the dot C of intersection of three-color and four-color equal grey curves; and determining the total amount of ink Out3=k3*4, where k3 is the dot area coverage of the dot C; if the three-color and four-color equal grey curves have no intersection, then determining the total amount of ink Out3=400.

The preferable embodiment calculates the total amount of ink Out3 in accordance with the curve intersection judging method. As shown in FIGS. 4 and 5, the three-color and four-color equal grey curves have no intersection, so that the dot whose dot area coverage is 100% is used as dot of the total amount of ink, that is, k3=100, and the calculated total amount of ink is Out3=k3*4=100*4=400.

Preferably, the step S30 includes:

(A) calculating the first total amount of ink Out1, the second total amount of ink Out2 and the third total amount of ink Out3, respectively, the specific procedures have been described in detail above and thus the description thereof is omitted here; and (B) determining the total amount of ink out=min(Out1, Out2, Out3), in which min( . . . ) is a function to find the minimum value of the three parameters.

For FIGS. 4 and 5, out=min(Out1,Out2,Out3)=min(328,344,400)=328

Figure 6:
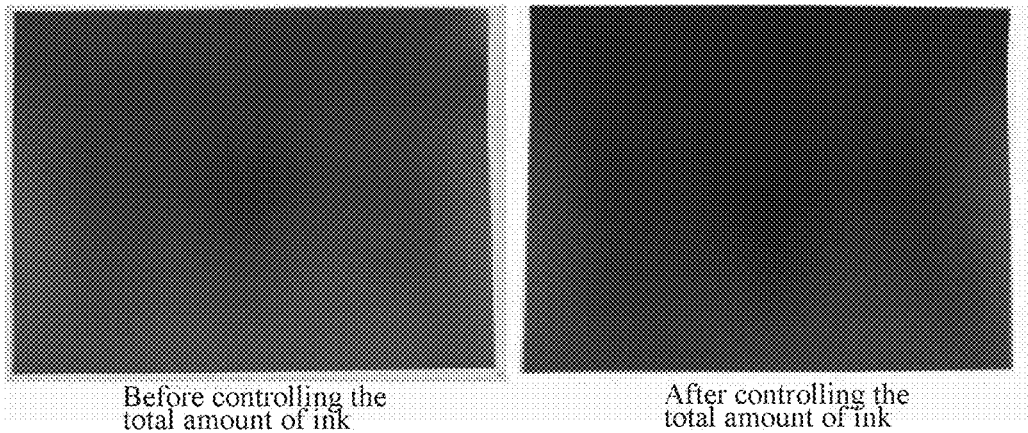
FIG. 6 illustrates an effect picture before and after controlling the total amount of ink according to a preferable embodiment of the present application.

FIG. 6 illustrates effect pictures before and after controlling the total amount of ink by using the calculated result (328) above, the left picture is the picture before controlling the total amount of ink, it can be seen from the left picture that the ink pilling has been generated in the shadow and the gradation is not good; and the right picture is the picture after controlling the total amount of ink, in which there is basically no ink pilling, ink flowing, and the gradation is kept well and no jump is generated, so that the object of the present invention is achieved.

It should be noted that, because of the publishing, the color figures of the present application are disclosed in black and white way. Therefore, the printing effect cannot be shown clearly, but will be explained in words.

Figure 7:
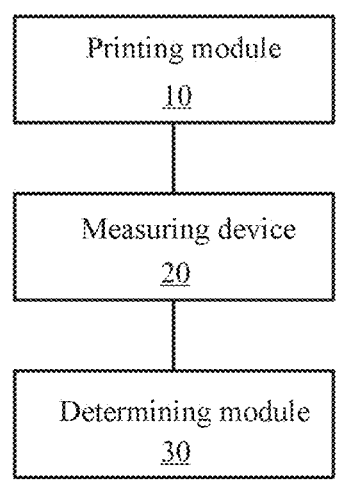
FIG. 7 is a schematic diagram illustrating an apparatus for measuring the total amount of ink of an inkjet printing device according to an embodiment of the present application.

FIG. 7 is a schematic diagram illustrating an apparatus for measuring the total amount of ink of an inkjet printing device according to an embodiment of the present application, and the apparatus includes:

a printing module 10 configured to print a sampling figure;

a measuring device 20 configured to measure the color of the sampling figure by a measuring device; and a determining module 30 configured to determine the total amount of ink according to the measurements.

The apparatus can improve the inkjet printing quality.

Preferably, the printing module 10 includes:

a first printing module configured to print a series of CMY three-color equal gray blocks: TD={$a_1, a_2, \ldots, a_i, \ldots, a_m$}, $a_i \in [0,100\%]$; and s second printing module configured to print a series of CMYK four-color equal gray blocks: QD={$b_1, b_2, \ldots, b_i, \ldots, b_n$}, $b_i \in [0,100\%]$;

where TD represents a set of dot area coverage of the CMY three-color equal gray blocks in an ascending order; $a_i$ represents the i-th dot area coverage of the CMY three-color equal gray blocks; m represents the number of the CMY three-color equal gray blocks; QD represents a set of dot area coverage of the CMYK four-color equal gray blocks in an ascending order; $b_i$ represents the i-th dot area coverage of the CMYK four-color equal gray blocks; n represents the number of the CMYK four-color equal gray blocks; and the dot area coverage of the blocks satisfies the following relationship: $a_1 \geq b_1$, $a_m = b_n = 100\%$.

Preferably, the measuring device 20 includes:

a first measuring module configured to measure the following data of a series of CMY three-color equal gray blocks: TM={$s_1, s_2, \ldots, s_1, \ldots, s_m$}; and a second measuring module configured to measure the following data of a series of CMYK four-color equal gray blocks: QM={$t_1, t_2, \ldots, t_i, \ldots, t_n$};

where TM represents a set of measured data of the CMY three-color equal gray blocks; $s_i$ represents the measured value of the block $p_i$ of the set TC; QM represents a set of measured data of the CMYK four-color equal gray blocks; $t_i$ represents the measured value of the block $q_i$ of the set QC;

$$TC=\{p_1, p_2, \ldots, p_i, \ldots, p_m\}, QC=\{q_1, q_2, \ldots, q_i, \ldots, q_n\}.$$

where TC represents a color set of the CMY three-color equal gray blocks; $p_i$ represents the color of the i-th dot of the CMY three-color equal gray blocks, $p_i=\{C_i+M_i+Y_i\}$, $i \in [1, m]$, $C_i$, $M_i$, and $Y_i$ represent the color of the i-th dot of C, M and Y in the CMY three-color equal gray blocks, respectively, and $C_i$, $M_i$, and $Y_i$ satisfy the following relationship: $C_i=M_i=Y_i=a_i$; QC represents a color set of the CMYK four-color equal gray blocks; $q_i$ represents the color of the i-th dot of the CMYK four-color equal gray blocks, $q_i=\{C_i+M_i+Y_i+K_i\}$, $i \in [1,n]$, $C_i$, $M_i$, $Y_i$ and $K_i$ represent the color of the each dot of C, M, Y and K in the CMYK four-color equal gray blocks, respectively, and $C_i$, $M_i$, $Y_i$ and $K_i$ satisfy the following relationship: $C_i=M_i=Y_i=K_i=b_i$.

Preferably, the determining module 30 includes:

a first calculating module configured to calculate the first total amount of ink Out1, the second total amount of ink Out2 and the third total amount of ink Out3, respectively, and the specific calculating procedures including:

calculating the following equation 1 for the CMY three-color equal grey:

$$Sp3 = \begin{cases} 100 & (-0.05 < temp < 0.05) \\ \dfrac{Sumx1 * Sumy - Sumx0 * Sumxy}{temp} & (temp \leq -0.05 \text{ or } temp \geq 0.05) \end{cases}$$

$$\text{where} \begin{cases} sumx0 = num \\ Sumx1 = \sum_{i=1}^{num} x[i] \\ Sumx2 = \sum_{i=1}^{num} (x[i]*x[i]) \\ Sumy = \sum_{i=1}^{num} (y[i]*100) \\ Sumxy = \sum_{i=1}^{num} (x[i]*y[i]*100) \\ temp = Sumx1*Sumx1 - Sumx0*Sumx2 \end{cases}$$

num represents the number of the dots of CMY three-color equal grey;

x[i] represents the dot area coverage of the i-th dot of the CMY three-color equal gray blocks; and y[i] represents the measured value of the i-th dot of the CMY three-color equal gray;

$$Sp3 = \begin{cases} 100 & (-0.05 < temp < 0.05) \\ \dfrac{Sumx1*Sumy - Sumx0*Sumxy}{temp} & (temp \le -0.05 \text{ or } temp \ge 0.05) \end{cases}$$

from the n scatter dots of the CMYK four-color equal grey, beginning with the first dot, continuous t dots are chosen each time, t∈[3,n], and then they are calculated in turn according to the following equation 2:

$$Sp4[i] =$$
$$\begin{cases} 100 & (-0.05 < temp < 0.05) \\ \dfrac{Sumx1*Sumy - Sumx0*Sumxy}{temp} & (temp \le -0.05 \text{ or } temp \ge 0.05) \end{cases}$$

where num represents t, x[i] represents the dot area coverage of the i-th dot of the CMYK four-color equal gray; and y[i] represents the measured value of the i-th dot of the CMYK four-color equal gray;

the first time: choosing the dots 1, 2, . . . , 1+t and bringing them into the equation 2 to calculate sp4[1];

the second time: choosing the dots 2, 3, . . . , 2+t and bringing them into the equation 2 to calculate sp4[2];

. . . .

the i-th time: choosing the dots i, 1+1, . . . , i+t and bringing them into the equation 2 to calculate sp4[i];

. . . .

the (n−t)-th time: choosing the dots n−t, (n−t)+1, . . . , n and bringing them into the equation 2 to calculate sp4[n−t]; for the data of CMYK four-color equal grey blocks, when the process is proceeded to a dot A, if sp4[i+1]<sp4[i]*n or sp4[i+1]<sp3*n, where n is coefficient, the total amount of ink is determined to Out1=k1*4, where k1 is the dot area coverage of the dot A; if the dot which meets the above conditions cannot be found, the total amount of ink is determined to Out1=400;

using a density of a dot at which C, M and Y of the CMY three-color equal grey blocks satisfy the relationship C=M=Y=100 as the maximum density; looking for the dot B with the same density in the CMYK four-color equal curves; and determining the total amount of ink Out2=K2*4, where k2 is the dot area coverage of the dot B; if the dot which meets the above conditions cannot be found, then determining the total amount of ink Out2=400; and drawing a curve graph on the basis of measurement result by using the dot area coverage as the horizontal axis and using the measured value as vertical axis, in which the sets TD and TM are used to the data of the CMY three-color equal grey and the sets QD and QM are used to the data of the CMYK four-color equal grey; looking for the dot C of intersection of three-color and four-color equal grey curves; and determining the total amount of ink Out3=k3*4, where k3 is the dot area coverage of the dot C; if the three-color and four-color equal grey curves have no intersection, then determining the total amount of ink Out3=400;

a second calculating module configured to determine the total amount of ink out=min(Out1, Out2, Out3), in which min( . . . ) is a function to find the minimum value of the three parameters.

In view of the above, the embodiments of the present invention can automatically measure a substantially accuracy value of the total amount of ink for different combinations of paper, ink and apparatus, and take this value as the reference to determine an accuracy value of the total amount of ink with the visual observation, so that the ink pilling, ink flowing and gradation loss can be effectively avoided.

It will be readily apparent to those skilled in the art that the modules or steps of the present application may be implemented with a common computing device, the modules or steps can be concentrated or run in a single computing device or distributed in a network composed of multiple computing devices. Optionally, the modules or steps may be achieved by using codes of the executable program, so that they can be stored in the storage medium to implement by the computer, or they can be fabricated into respective integrated circuit module, respectively, or the plurality of the modules or steps can be fabricated into an individual integrated circuit module. Therefore, the present application is not limited to any particular hardware, software or combination thereof.

The foregoing is only preferred embodiments of the present application, and it is not intended to limit the present application. Moreover, it will be apparent to those skilled in the art that various modifications and variations can be made to the present application. Thus, any modifications, equivalent substitutions, improvements etc. within the spirit and principle of the present application should be included within the scope of protection of the application.

What is claimed is:

1. A computer-implemented method for measuring the total amount of ink of an inkjet printing device comprising:
   printing a sampling figure;
   measuring colors of the printed sampling figure by a measuring device; and determining the total amount of ink from the measured colors, wherein the colors comprise cyan C, magenta M, yellow Y and black K, and
   wherein the printing comprises:
   printing a series of CMY three-color equal gray blocks;
   printing a series of CMYK four-color equal gray blocks.

2. The method according to claim 1, wherein the measuring comprises:
   measuring data of the series of CMY three-color equal gray blocks; and
   measuring data of the series of CMYK four-color equal gray blocks;
   wherein,
   given $C_i$, $M_i$, and $Y_i$ represent the color of an i-th dot of C, M and Y in the CMY three-color equal gray blocks, respectively, the measured data for $C_i$, $M_i$, and $Y_i$ satisfy a relationship of $C_i=M_i=Y_i=a_i$; where $a_i$ represents an i-th dot area coverage of the CMY three-color equal gray blocks, and given $C_i$, $M_i$, $Y_i$ and $K_i$ represent the color of the each dot of C, M, Y and K in the CMYK four-color equal gray blocks, respectively, $C_i$, $M_i$, $Y_i$ and $K_i$ satisfy a relationship of $C_i=M_i=Y_i=K_i=b_i$, where $b_i$ represents an i-th dot area coverage of the CMY four-color equal gray blocks.

3. The method according to claim 2, wherein the determining comprises:

for a dot i of the CMYK four-color equal grey blocks, if sp4[i+1]<sp4[i]*n or sp4[i+1]<sp3*n, the total amount of ink Out1 is determined as k1*4, otherwise, the total amount of ink Out1 is determined as Out1=400, where k1 is the dot area coverage of the dot i and n represents a number of scatter dots of the CMYK four-color equal grey blocks, where $$Sp3 = \begin{cases} 100 & (-0.05 < temp < 0.05) \\ \dfrac{Sumx1 * Sumy - Sumx0 * Sumxy}{temp} & (temp \le -0.05 \text{ or } temp \ge 0.05) \end{cases}$$

$$\text{where} \begin{cases} sumx0 = num \\ Sumx1 = \sum_{i=1}^{num} x[i] \\ Sumx2 = \sum_{i=1}^{num} (x[i]*x[i]) \\ Sumy = \sum_{i=1}^{num} (y[i]*100) \\ Sumxy = \sum_{i=1}^{num} (x[i]*y[i]*100) \\ temp = Sumx1 * Sumx1 - Sumx0 * Sumx2 \end{cases}$$

where, num represents the number of dots of CMY three-color equal grey;

x[i] represents a dot area coverage of an i-th dot of the CMY three-color equal gray; and y[i] represents the measured value of the i-th dot of the CMY three-color equal gray;

$Sp4[i] =$ $$\begin{cases} 100 & (-0.05 < temp < 0.05) \\ \dfrac{Sumx1 * Sumy - Sumx0 * Sumxy}{temp} & (temp \le -0.05 \text{ or } temp \ge 0.05) \end{cases}$$

wherein num∈[3, n], x[i] represents the dot area coverage of the i-th dot of the CMYK four-color equal gray; and y[i] represents the measured value of the i-th dot of the CMYK four-color equal gray.

4. The method according to claim 2, wherein the colors comprise cyan C, magenta M, yellow Y and black K, and wherein the determining comprises:

drawing a curve for measured data of the three-color and four-color equal grey blocks, respectively, in a coordinate system where dot area coverage s of the colors is used as the horizontal axis and the measured data is used as vertical axis, determining if there is an intersection dot C of the three-color and four-color equal grey curves;

if yes, determining the total amount of ink Out3=k3*4, where k3 is the dot area coverage of the dot C;

otherwise, determining the total amount of ink Out3=400.

5. The method according to claim 2, wherein the determining comprises:

calculating the first total amount of ink Out1, the second total amount of ink Out2 and third total amount of ink Out3, respectively, for the CMY four-color equal grey blocks; and determining the total amount of ink out=min(Out1, Out2, Out3), in which min( . . . ) is a function to find the minimum value of the three parameters.

6. The method according to claim 5, wherein for a dot i of the CMYK four-color equal grey blocks, if sp4[i+1]<sp4[i]*n or sp4[i+1]<sp3*n, the total amount of ink Out1 is determined as k1*4, otherwise, the total amount of ink Out1 is determined as Out1=400, where k1 is the dot area coverage of the dot i and n represents a number of scatter dots of the CMYK four-color equal grey blocks, where $$Sp3 = \begin{cases} 100 & (-0.05 < temp < 0.05) \\ \dfrac{Sumx1 * Sumy - Sumx0 * Sumxy}{temp} & (temp \le -0.05 \text{ or } temp \ge 0.05) \end{cases}$$

$$\text{where} \begin{cases} sumx0 = num \\ Sumx1 = \sum_{i=1}^{num} x[i] \\ Sumx2 = \sum_{i=1}^{num} (x[i]*x[i]) \\ Sumy = \sum_{i=1}^{num} (y[i]*100) \\ Sumxy = \sum_{i=1}^{num} (x[i]*y[i]*100) \\ temp = Sumx1 * Sumx1 - Sumx0 * Sumx2 \end{cases}$$

where num represents the number of the dots of CMY three-color equal grey; x[i] represents the dot area coverage of the i-th dot of the CMY three-color equal gray blocks; and y[i] represents a measured value of the i-th dot of the CMY three-color equal gray;

$Sp4[i] =$ $$\begin{cases} 100 & (-0.05 < temp < 0.05) \\ \dfrac{Sumx1 * Sumy - Sumx0 * Sumxy}{temp} & (temp \le -0.05 \text{ or } temp \ge 0.05) \end{cases}$$

where num represents t, x[i] represents the dot area coverage of the i-th dot of the CMYK four-color equal gray; and y[i] represents the measured value of the i-th dot of the CMYK four-color equal gray.

7. The method according to claim 5, the total amount of ink Out2 is determined by:
  determining if there is a dot in the CMYK three-color equal grey blocks, at which C, M and Y satisfy the relationship C=M=Y=100;
  if yes,
  looking for a dot B with same density in the CMYK four-color equal grey blocks; and
  determining the total amount of ink Out2=K2*4, where k2 is a dot area coverage of the dot B; and
  otherwise, determining the total amount of ink Out2=400.

8. The method according to claim 5, wherein the total amount of ink Out 3 is determined by:
  drawing a curve for measured data of the three-color and four-color equal grey blocks, respectively, in a coordinate system where dot area coverage of the dots is used as the horizontal axis and the measured data is used as vertical axis;
  determining if there is a intersection dot C of the three-color and four-color equal grey curves; if yes,
  determining the total amount of ink Out3=k3*4, where k3 is the dot area coverage of the dot C; otherwise,
  determining the total amount of ink Out3=400.

9. A computer-implemented method for measuring the total amount of ink of an inkjet printing device comprising:
  printing a sampling figure;
  measuring colors of the printed sampling figure by a measuring device; and determining the total amount of ink from the measured colors, wherein the colors comprise cyan C, magenta M, yellow Y and black K, and:
  wherein the determining comprises:
  determining if there is a dot in the CMYK three-color equal grey blocks, at which C, M and Y satisfy the relationship C=M=Y=100;
  if yes,
  looking for a dot B with same density in the CMYK four-color equal grey blocks; and
  determining the total amount of ink Out2=K2*4, where k2 is a dot area coverage of the dot B; and
  otherwise determining the total amount of ink Out2=400.

10. An apparatus for measuring the total amount of ink of an inkjet printing device including:
  a printing module configured to print a sampling figure;
  a measuring device configured to measure the color of the sampling figure by a measuring device; and
  a determining module configured to determine the total amount of ink according to the measurements, wherein the-colors comprise cyan C, magenta M, yellow Y and black K, and:
  wherein the printing module is configured to print a series of the CMY three-color equal gray blocks and a series of the CMYK four-color equal gray blocks, respectively.

11. The apparatus according to claim 10, wherein the measuring device configured to:
  measure data of the series of CMY three-color equal gray blocks; and
  measure data of the series of CMYK four-color equal gray blocks,
  wherein,
  given $C_i$, $M_i$, and $Y_i$ represent colors of an i-th dot of C, M and Y in the CMY three-color equal gray blocks, respectively, the measured data for $C_i$, $M_i$, and $Y_i$ satisfy a relationship of $C_i=M_i=Y_i=a_i$, where $a_i$ represents an i-th dot area coverage of the CMY three-color equal gray blocks, and
  given $C_i$, $M_i$, $Y_i$ and $K_i$ represent the color of each dot of C, M, Y and K in the CMYK four-color equal gray blocks, respectively, $C_i$, $M_i$, $Y_i$ and $K_i$ satisfy a relationship of $C_i=M_i=Y_i=K_i=b_i$, where $b_i$ represents an i-th dot area coverage of the CMY four-color equal gray blocks.

12. The apparatus according to claim 11, wherein the determining module is configured to determine the total amount of ink by:
  calculating a first total amount of ink Out1, a second total amount of ink Out2 and a third total amount of ink Out3, respectively, for the CMY four-color equal grey blocks; and
  determining the total amount of ink out=min(Out1, Out2, Out3), in which min( . . . ) is a function to find a minimum value of the three parameters Out1, Out2, Out3.

13. The apparatus according to claim 12, wherein
for a dot i of the CMYK four-color equal grey blocks, if sp4[i+1]<sp4[i]*n or sp4[i+1]<sp3*n, the total amount of ink Out1 is determined by the determining module as k1*4, otherwise, the total amount of ink Out1 is determined by the determining module as Out1=400, where k1 is the dot area coverage of the dot i and n represents a number of scatter dots of the CMYK four-color equal grey blocks,
where $$Sp3 = \begin{cases} 100 & (-0.05 < temp < 0.05) \\ \dfrac{Sumx1 * Sumy - Sumx0 * Sumxy}{temp} & (temp \leq -0.05 \text{ or } temp \geq 0.05) \end{cases}$$

where
$$\begin{cases} sumx0 = num \\ Sumx1 = \sum_{i=1}^{num} x[i] \\ Sumx2 = \sum_{i=1}^{num} (x[i]*x[i]) \\ Sumy = \sum_{i=1}^{num} (y[i]*100) \\ Sumxy = \sum_{i=1}^{num} (x[i]*y[i]*100) \\ temp = Sumx1 * Sumx1 - Sumx0 * Sumx2 \end{cases}$$

where
num represents the number of the dots of CMY three-color equal grey; x[i] represents the dot area coverage of the i-th dot of the CMY three-color equal gray blocks; and y[i] represents a measured value of the i-th dot of the CMY three-color equal gray;

$$Sp4[i] = \begin{cases} 100 & (-0.05 < temp < 0.05) \\ \dfrac{Sumx1 * Sumy - Sumx0 * Sumxy}{temp} & (temp \leq -0.05 \text{ or } temp \geq 0.05) \end{cases}$$

where
num represents t, x[i] represents the dot area coverage of the i-th dot of the CMYK four-color equal gray; and y[i] represents the measured value of the i-th dot of the CMYK four-color equal gray.

14. The apparatus according to claim 12, wherein the determining module is configured to determine the total amount of ink Out2 by:

determining if there is a dot in the CMYK three-color equal grey blocks, at which C, M and Y satisfy the relationship C=M=Y=100;
if yes,
looking for a dot B with same density in the CMYK four-color equal grey blocks; and
determining the total amount of ink Out2=K2*4, where k2 is a dot area coverage of the dot B; and
otherwise, determining the total amount of ink Out2=400.

15. The apparatus according to claim 12, wherein the determining module is configured to determine the total amount of ink Out3 by:
drawing a curve for measured data of the three-color and four-color equal grey blocks, respectively, in a coordinate system where dot area coverage s of the colors is used as the horizontal axis and the measured data is used as vertical axis;
determining if there is a intersection dot C of the three-color and four-color equal grey curves; if yes,
determining the total amount of ink Out3=k3*4, where k3 is the dot area coverage of the dot C; otherwise,
determining the total amount of ink Out3=400.

* * * * *